Patented Sept. 19, 1939

2,173,711

UNITED STATES PATENT OFFICE 2,173,711

DETERIORATION INHIBITOR

Albert M. Clifford, Stow, Ohio, assignor to Wingfoot Corporation, Wilmington, Del., a corporation of Delaware No Drawing. Application January 9, 1936, Serial No. 58,436

11 Claims. (Cl. 18—50)

This invention relates to an improved method of retarding or inhibiting deterioration resulting from the ageing of rubber compounds and the like and to new compositions of matter having this function, as well as to rubber compounds containing such new substances. More particularly, the invention relates to hydrogenated furfuryl amine compounds in which the amino group is substituted by any one of various aromatic radicals.

Rubber articles, such as tires, are subject to deterioration during use due to the effects of air, heat, light and flexing so that the rubber gradually loses its tensile strength and other characteristic properties. Various substances have been used in rubber to retard the ageing thereof with varying success. It has now been found that a certain class of compounds, which may be termed hydrogenated furfuryl aryl amines, are effective in thus preserving the desired qualities of rubber. The hydrogenated furfuryl amines may be illustrated by the compound, tetrahydro furfuryl amine, having the formula

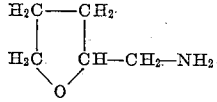

in which the furane ring has been hydrogenated. This compound can be reacted with any one of many phenolic compounds or phenolic materials to produce a secondary amine in which one hydrogen of the amino group is substituted by the hydrogenated furfuryl radical and another hydrogen of the amino group is substituted by the residue of the phenolic compound. Thus, the class of compounds contemplated by the invention may be represented by the formula R'—NH—R, where R' is a hydrogenated furfuryl radical and R is an aromatic radical.

Among the phenolic materials or compounds which may be reacted with the hydrogenated furfuryl amine may be mentioned phenol, alpha naphthol, beta naphthol, hydroxy acenaphthene, hydroxy biphenyl, hydroxy binaphthyl, or those phenols bearing one or more substituents on the ring, such as alkyl, other hydroxyl groups, NH$_2$, O-alkyl, N-(alkyl)$_2$, NH-alkyl, —NH-aryl, Cl, Br, I, etc. Also, it is not necessary that a single phenolic compound be used but, on the contrary, phenolic mixtures, consisting largely of phenolic materials, may be used, such as cresylic acid and the like.

Among the age resisters capable of being produced by this reaction may be mentioned tetrahydro furfuryl beta naphthylamine, tetrahydro furfuryl aniline, tetrahydro furfuryl tolyl amine, tetrahydro furfuryl xylyl amine, tetrahydro furfuryl amino biphenyl, tetrahydro furfuryl amino phenol, tetrahydro furfuryl anisidine, tetrahydro furfuryl phenetidine, tetrahydro furfuryl chlor aniline, etc. Other secondary amines of the same type, each characterized by the presence of a hydrogenated furfuryl radical, will readily suggest themselves and it is not intended to limit the invention to the compounds mentioned.

These compounds may be prepared readily by reacting the hydrogenated furfuryl amine with the phenolic compound or phenolic mixture selected and one procedure which may be used is illustrated by the following example.

Example 1

A mixture of 72 parts of beta naphthol, 50 parts of tetrahydro furfuryl amine, and 25 parts of granular sodium bisulphate, NaHSO$_4$, were heated under a reflux condenser for a period of 8 hours at a temperature of 180–190° C. The product obtained as a result of this reaction was washed successively with dilute hydrochloric acid, water, dilute sodium hydroxide and again with water. The residual product was taken up with ether and distilled under reduced pressure to yield approximately 47% of the theoretical of a product having a boiling point of 262–268° C. under a pressure of 42–45 mm.

Example 2

A mixture of 126.3 parts of tetrahydro furfuryl amine, 338 parts of cresylic acid and 2.33 parts of aluminum chloride were heated for 14 hours at a temperature of 340° C. The reaction product obtained was distilled under reduced pressure and that fraction boiling between 130–300° C. under 55 mm. pressure and amounting to 153 parts was used for testing in rubber.

In order to test the effectiveness of this new class of compounds in rubber, they were added to a stock having the following composition:

| | Parts by weight |
|---|---|
| Extracted rubber | 100 |
| Zinc oxide | 5 |
| Sulphur | 3 |
| Hexamethylene tetramine | 1 |
| Stearic acid | 1.5 |
| Antioxidant | 1 |

Samples of this stock containing the antioxidant were then subjected to low temperature ageing for a period of 6 days in an oxygen bomb under pressure of 150 pounds per square inch and at a temperature of 50° C. The results obtained were tabulated as follows:

| Cure | Before ageing | | | | After ageing | | | | Percent wt. inc. |
|---|---|---|---|---|---|---|---|---|---|
| | Tens. | Elg. | 500% | 700% | Tens. | Elg. | 500% | 700% | |
| TETRAHYDRO FURFURYL BETA NAPHTHYLAMINE | | | | | | | | | |
| 35/285 | 95 | 850 | 14 | 42 | 106 | 800 | 18 | 59 | .07 |
| 50 | 112 | 785 | 19 | 67 | 120 | 765 | 20 | 80 | .18 |
| 70 | 143 | 785 | 21 | 85 | 150 | 750 | 28 | 110 | .22 |
| TETRAHYDRO FURFURYL AMINE+CRESYLIC ACID | | | | | | | | | |
| 35/285 | 110 | 900 | 12 | 34 | 89 | 825 | 13 | 41 | .18 |
| 50 | 136 | 845 | 17 | 59 | 111 | 800 | 18 | 60 | .29 |
| 70 | 150 | 795 | 21 | 80 | 129 | 750 | 24 | 95 | .41 |

The antioxidants were also subjected to a high temperature ageing test in a rubber stock of a somewhat different composition as follows:

|  | Parts by weight |
|---|---|
| Smoked sheet | 100 |
| Zinc oxide | 92.5 |
| Carbon black | .6 |
| Fe₂O₃ | .7 |
| Sulphur | 3.5 |
| D. P. G. | .7 |
| Antioxidant | 5.0 |

This more severe test was conducted by placing the samples in an air bomb for 7 hours under a pressure of 80 pounds per square inch pressure and at a temperature of 114° C. The results were tabulated as follows:

| Cure | Original | | | | Aged | | | |
|---|---|---|---|---|---|---|---|---|
| | Tens. | Elg. | 300% | 500% | Tens. | Elg. | 300% | 500% |
| TETRAHYDRO FURFURYL BETA NAPHTHYLAMINE | | | | | | | | |
| 35/285 | 205 | 695 | 29 | 84 | 65 | 640 | 16 | 37 |
| 50 | 212 | 660 | 33 | 97 | 63 | 580 | 20 | 45 |
| 70 | 237 | 665 | 38 | 106 | 77 | 570 | 27 | 60 |
| TETRAHYDRO FURFURYL AMINE+CRESYLIC ACID | | | | | | | | |
| 35/285 | 180 | 705 | 22 | 67 | 72 | 650 | 16 | 39 |
| 50 | 204 | 700 | 27 | 79 | 79 | 625 | 20 | 47 |
| 70 | 227 | 690 | 31 | 91 | 83 | 565 | 26 | 62 |

It will be noted that, even under these severe conditions, the rubber samples retained a considerable proportion of their tensile strength after ageing.

While there have been disclosed herein certain preferred embodiments of the invention, it is not intended to limit the invention thereto since the proportions of the materials utilized may be varied and other materials having equivalent chemical properties may be substituted. It will also be understood that the term "rubber" as used herein includes rubber, balata, synthetic rubber, latex, reclaimed rubber and similar materials, all of which may be reasonably included within the meaning of the term. The invention, then, is not limited to the specific embodiments described but only by the appended claims which are intended to include all features of patentable novelty residing in the invention.

What I claim is:

1. A method of preserving rubber which comprises treating the same with a secondary tetrahydro furfuryl aryl amine.

2. A method of preserving rubber which comprises treating the same with a secondary tetrahydro furfuryl naphthylamine.

3. A method of preserving rubber which comprises treating the same with N-tetrahydro furfuryl beta naphthylamine.

4. A method of preserving rubber which comprises treating the same with N-tetrahydro furfuryl tolyl amine.

5. A rubber product possessing improved age-resisting properties comprising vulcanized rubber which has been treated with N-tetrahydro furfuryl beta naphthylamine.

6. A method of preserving rubber which comprises treating the same with an age resister having the formula R'-NH-R in which R' is a tetrahydro furfuryl radical and R is a phenyl group which may contain substituent groups selected from the group consisting of alkyl, hydroxyl, NH₂, alkoxy, N(alkyl)₂, NH-alkyl, NH-aryl, chlorine, bromine and iodine.

7. A method of preserving rubber which comprises treating the same with an age resister having the formula R'-NH-R, in which R' is a tetrahydro furfuryl radical and R is an aryl radical of the benzene and naphthalene series which may contain substituent groups selected from the group consisting of alkyl, hydroxyl, NH₂, alkoxy, N(alkyl)₂, NH-alkyl, NH-aryl, chlorine, bromine and iodine.

8. A rubber product possessing improved age resisting properties comprising rubber which has been vulcanized in the presence of an age resister having the formula R''-NH-R in which R' is a tetrahydro furfuryl radical and R is a phenyl group which may contain substituent groups selected from the group consisting of alkyl, hydroxyl, NH₂, alkoxy, N(alkyl)₂, NH-alkyl, NH-aryl, chlorine, bromine and iodine.

9. A method of preserving rubber which comprises treating the same with a secondary tetrahydrofurfuryl aryl amine in which the aryl radical may contain substituent groups selected from the group consisting of alkyl, hydroxyl, NH₂, alkoxy, N(alkyl)₂, NH-alkyl, NH-aryl, chlorine, bromine and iodine.

10. A rubber product possessing age resisting properties comprising rubber which has been vulcanized in the presence of a secondary tetrahydrofurfuryl aryl amine in which the aryl radical may contain substituent groups selected from the group consisting of alkyl, hydroxyl, NH₂, alkoxy, N(alkyl)₂, NH-alkyl, NH-aryl chlorine, bromine and iodine.

11. A method of preserving rubber which comprises treating the same with a mixture of secondary tetrahydrofurfuryl aryl amines in which the aryl radical may contain substituent groups selected from the group consisting of alkyl, hydroxyl, NH₂, alkoxy, N(alkyl)₂, NH-alkyl, NH-aryl, chlorine, bromine and iodine.

ALBERT M. CLIFFORD.